(No Model.)

F. W. SMITH.
CORN COOKING MACHINE.

No. 512,232. Patented Jan. 2, 1894.

3 Sheets—Sheet 1

Witnesses
A. C. Perry.
Geo. N. Fernald

Inventor
Frank W. Smith
By G. S. Bird ATTORNEY (No Model.)  
3 Sheets—Sheet 2.
F. W. SMITH.
CORN COOKING MACHINE.
No. 512,232.  
Patented Jan. 2, 1894.
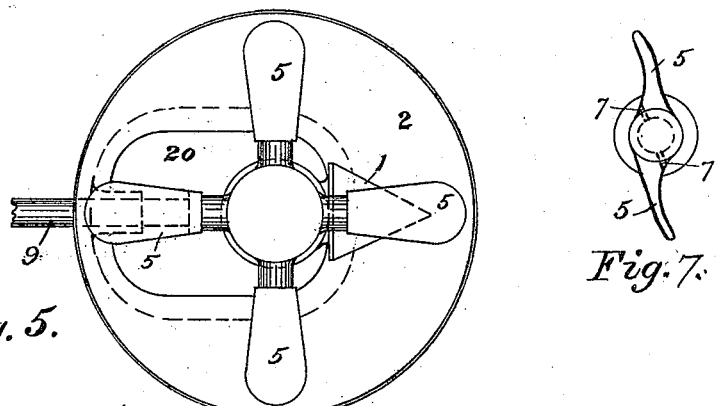
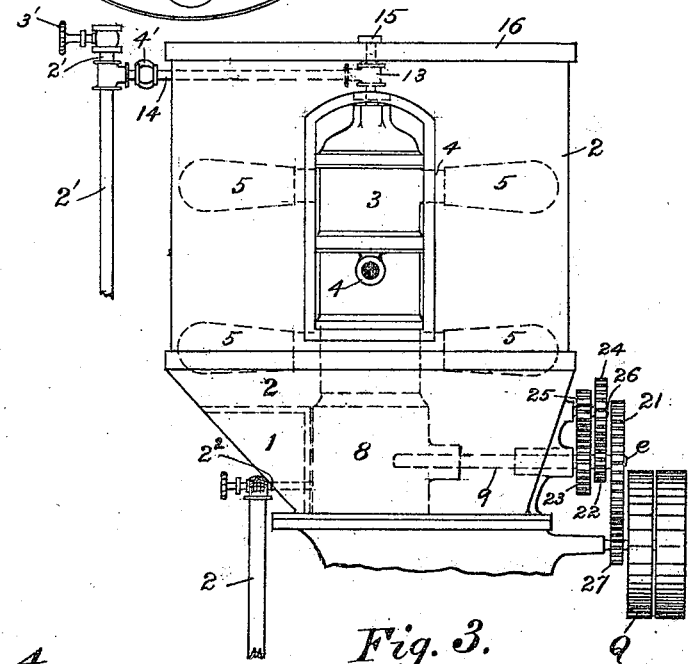
Witnesses  
A. C. Derry  
Geo. N. Fernald
Inventor  
Frank W. Smith  
BY _____ ATTORNEY (No Model.)

3 Sheets—Sheet 3.

F. W. SMITH.
CORN COOKING MACHINE.

No. 512,232.   Patented Jan. 2, 1894.

Witnesses

Inventor
Frank W. Smith
BY _____ ATTORNEY

UNITED STATES PATENT OFFICE.

FRANK W. SMITH, OF PORTLAND, MAINE.

CORN-COOKING MACHINE.

SPECIFICATION forming part of Letters Patent No. 512,232, dated January 2, 1894.

Application filed March 24, 1892. Serial No. 426,259. (No model.)

*To all whom it may concern:*

Be it known that I, FRANK W. SMITH, a citizen of the United States, residing at Portland, in the county of Cumberland and State of Maine, have invented certain new and useful Improvements in Corn-Cooking Machines; and I do hereby declare that the following is a full, clear, and exact description of the invention, which will enable others skilled in the art to which it appertains to make and use the same.

My invention relates to machines for cooking corn and similar substances and consists of a vessel provided with means for the introduction of steam and the agitation of the corn during the cooking process.

The cooker may be used in connection with a device whereby the proper amount of corn is withdrawn from the cooker and forced into the cans which may be fed automatically for the purpose.

Figure 2:
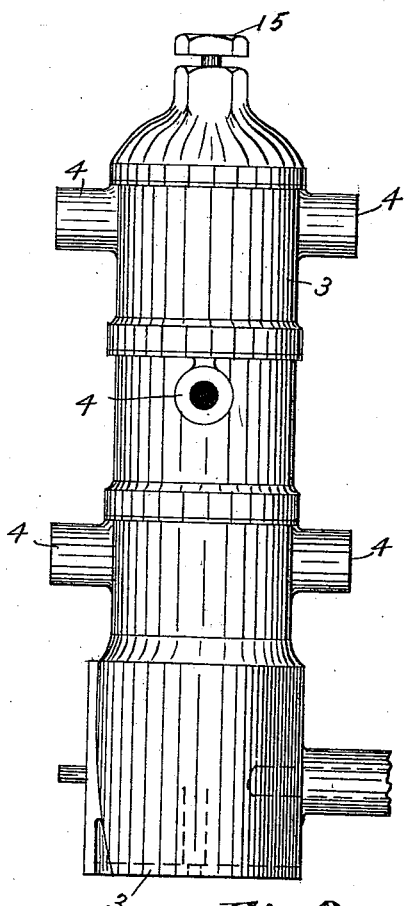
Figure 1:
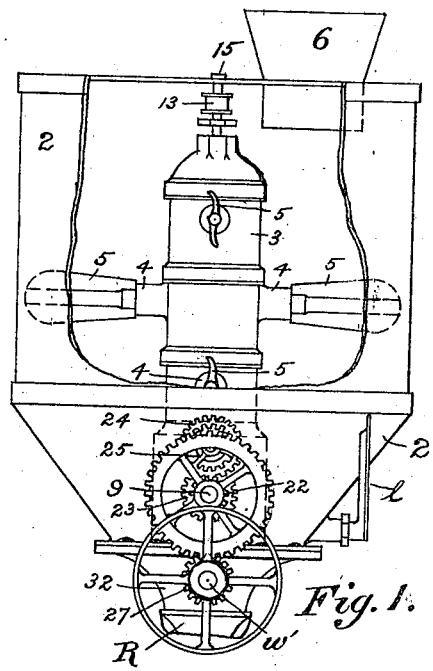
Figure 6:
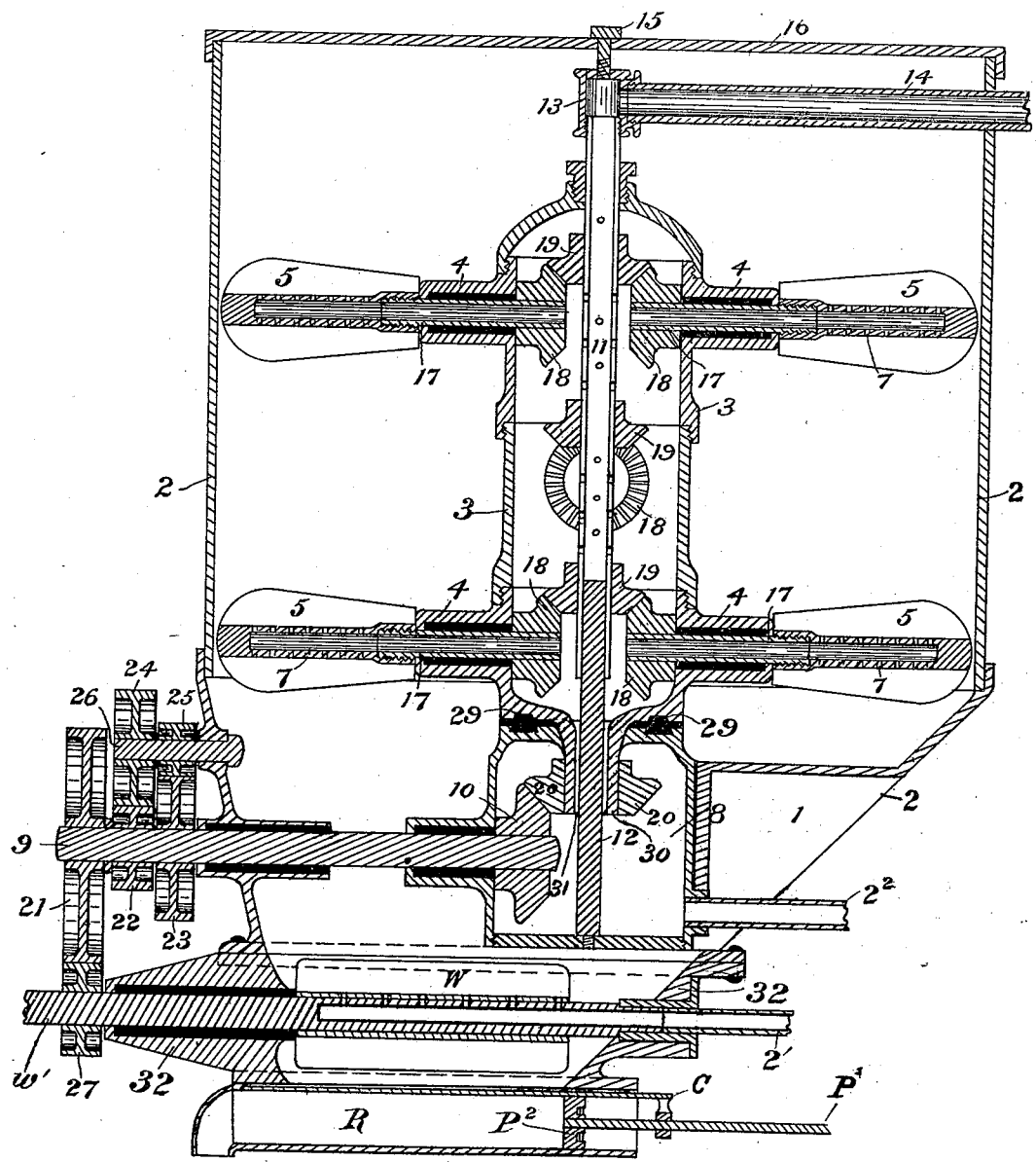

Referring to the drawings:—Figure 1 is a front elevation of the machine. Fig. 2 is a detail showing the side elevation of the drum or separator of the cooking chamber. Fig. 3 is a side elevation of the machine. Fig. 4 is a top plan of one of the revolving arms. Fig. 5 is a plan of the cooking chamber, the cover being removed. Fig. 6 is a vertical section of the cooking chamber and charge chamber. Fig. 7 is a plan of the stirrers.

The cooking chamber 2 is shown in Figs. 1, 3, and 5. It is a closed vessel, steam tight with the exception of an opening at the top for the admission of the substance to be cooked, and so constructed at the bottom as to facilitate the passage of such substance into the can-filling device. As I have constructed it, it consists of a box, preferably cylindrical in form, tightly connected with a hopper-shaped base, all resting upon and supported by the hopper of the charge chamber hereinafter described. The chamber 2 is more easily constructed in two parts as described, but can obviously be cast, or otherwise made, in one piece. Centrally located within the chamber 2 is a hollow step or base 8, between which and the rear of the vessel is a partition 1 with sloping sides. See Fig. 5. A shaft 9 passing through proper packing boxes in the side of vessel or cooking chamber 2 and the base 8 is provided within the latter with the miter gear 10. Upon the base 8, its surface being provided with suitable packing and the babbitts 29, rests the circular drum or separator 3, the lower end of which terminates in a sleeve 30 which projects downward within the base 8 and is concentric therewith. Fixed at the center of the bottom of the base is a solid shaft 12 which extends upward through the opening 31 in the sleeve 30, into the lower part of the drum 3, within which it is tightly embraced by the hollow shaft or tube 11 which within the drum is perforated, as shown in Fig. 6. The shaft or tube 11 extends upward through a packing box in the head of the drum and terminates in a box 13 through one side of which enters a steam-pipe 14 which passes out through the side of the vessel 2. See Fig. 6. The box 13 is held in place by a pivot 15 which passes down through the center of the cover 16 which closes the top of the chamber 2, and may be provided with a hopper 6. The drum 3 is provided with two or more pairs of projecting hollow boxes 4 4; see Figs. 1, 3 and 6, each pair being placed at a different level and alternately at right angles, those of each pair being directly opposite each other.

Within each of the boxes 4, 4 are hollow shafts 17 on the inner ends of which, within the drum 3, are miter gears 18, which engage with similar gears 19 attached to the shaft 11. Near the lower end of the shaft 12 is fixed the miter gear 20 which engages with the gear 10 before described. The outer ends of the shafts 17 carry the arms 5, 5. See Figs. 4 and 5. These arms are constructed with a central hollow spine or stem adapted to be tightly united with the shaft 17 and provided with perforations 7 as shown in Fig. 4. Extending upon either side of the hollow stem are plates or wings. See Figs. 4, 5 and 7. These plates are preferably curved, the interior of the curve being preferably upon the same side on which the perforations are found, while the convexity of the curve is upon the side toward which the fan or arm rotates. The cooking chamber 2 rests upon and is connected with the hopper 32 of the charge-chamber by an elliptical opening. The shaft 9 is provided outside the cooking chamber with the spur gear 21 having the pinion 22 and the spur gear 23, the two latter of which engage respectively with the gears 24 and 25 on the shaft 26 which is secured in appropriate bearings in the side of the lower part of the vessel 2. The gear 21 and pinion 22 are rigidly attached one to the other as are the gears 24 and 25, the former revolving loosely upon the shaft 9, as do the latter (24 and 25) on the shaft 26, the gear 23 being fixed to the shaft 9. The gear 21 engages with the gear 27 on the perforated hollow shaft $w'$ which is held in appropriate bearings in the ends of the hopper 32 of the charge chamber R and carries the agitator W consisting of flat blades hung upon either side of the shaft. The rear bearing of the hollow shaft $w'$ in the hopper 32 is so arranged that it may be entered from without by a branch of the steam-pipe $2'$ by which steam may be introduced into the shaft. See Fig. 6.

The frame of the machine supports a horizontal elongated charge chamber R having a semi-circular cross section and being open at the top where it connects with the hopper 32, which is supported by it.

The opening between the charge chamber R and the hopper 32 is controlled by the cut-off plate C. $P^2$, $P'$ represent respectively the plunger within the charge chamber 32 and a rod by which the plunger may be operated.

To ascertain the temperature of the contents of the cooking chamber, a thermometer $l$ may be used, it being connected, if desirable, with a pipe communicating with the interior of the chamber, as shown in Fig. 1.

The operation of my machine is as follows: The corn or other substance to be cooked is fed into the vessel 2 through the hopper 6. Steam is supplied by the pipe $2'$, the supply being controlled by the stop-cock or valve $3'$. The steam is admitted through the pipe 14 from the pipe $2'$ (the valve $4'$ being opened) into the drum or separator 3, which is made to rotate by power imparted to the shaft 9 by the gears already described from the shaft $w'$. Rotation of the drum causes the rotation of the arms 5, 5, the gears 18 being rotated upon the fixed gears 19. The corn is thus thoroughly cooked by the direct action of the steam as it escapes from the perforations in the arms, which thoroughly stir and intermix the various portions of the mass. Placing the perforations near the base of the rear sides of the arm or fan facilities the cooking process as the steam is thus permitted to escape into the pocket which is formed in the corn behind the fan or arm as it revolves. The steam which condenses in the pipes and the drum passes downward through the latter and through the channel 31 in the sleeve 30 and thence into the exhaust pipe $2^2$ by which it is carried into a suitable waste pipe. The corn being thus cooked descends through the vessel 2 until it enters the hopper 32 of the charge chamber where it is still further agitated and kept from cooling by the revolutions of the agitator W, steam being admitted to the interior of its shaft by a branch of the steam pipe. Power is imparted to the shaft $w'$ by the pulley Q which is connected with the main shaft by a belt.

By reason of the rotation of the arms 5 at the same time that they revolve about the center of the cooking vessel, the corn is prevented from rotating in a mass about the separator and is instantly and thoroughly agitated and intermingled.

What I claim is—

1. An upright cooking vessel having an opening in the bottom communicating with a charge-chamber, a drum or separator pivoted adjacent thereto, the remaining space at the bottom being occupied by a partition with outwardly sloping sides, arms upon said drum and means for rotating said arms substantially as described.

2. The combination with a cooking vessel of a drum or separator having curved arms or stirrers perforated upon the base of the interior of the curve together with means for rotating said stirrers, substantially as described.

3. An upright cooking vessel having a discharge opening at the bottom communicating with a charge-chamber, a drum or separator stepped or pivoted adjacent to said opening, the remaining space at the bottom being occupied by a partition with outwardly sloping sides, an exhaust pipe communicating with the bottom of said drum, a steam pipe connected with the top of said drum, winged hollow arms having perforations and connected with said drum together with means for rotating said drum and said arms, substantially as described.

4. The combination with a cooking vessel of a drum or separator stepped within said vessel with hollow arms pivoted upon the sides of said drum, said arms being provided with curved wings having perforations together with means for rotating said arms, substantially as described.

5. In combination with a vessel for cooking corn or other substances, a charge chamber connected therewith having a discharge nozzle and a hollow perforated agitator with means for revolving said agitator, substantially as described.

6. In a device for cooking corn and other substances, consisting of a vessel having a drum or pipe, means for revolving said drum or pipe, means for admitting steam into said drum, arms connected with said drum, said arms being perforated in such manner that the steam is discharged therefrom in a direction opposite to that of the motion of the arms.

7. A cooking vessel having a discharge opening at the bottom, a drum or separator having apertures, said drum being pivoted adjacent to said opening, a partition with outwardly sloping sides between said drum and the wall of the vessel opposite said opening, and means for rotating said drum, substantially as described.

8. An upright cooking vessel having a discharge opening in the bottom, a drum or separator having perforated arms thereon, said drum being stepped adjacent to said opening, a steam pipe entering said drum, a partition with outwardly sloping sides between the wall of said vessel, opposite to said opening, and the drum, and means for rotating said drum, substantially as described.

In testimony that I claim the foregoing as my invention I have hereunto set my hand this 21st day of March, A. D. 1892.

FRANK W. SMITH.

In presence of—
   GEO. E. BIRD,
   A. C. BERRY.